US008208888B2

(12) United States Patent
Chutorash et al.

(10) Patent No.: US 8,208,888 B2
(45) Date of Patent: Jun. 26, 2012

(54) VEHICLE TO VEHICLE WIRELESS CONTROL SYSTEM TRAINING

(75) Inventors: Richard J. Chutorash, Oakland Township, MI (US); Philip J. Vanderwall, Marne, MI (US)

(73) Assignee: Johnson Controls Technology Company, Holland, MI (US)

( * ) Notice: Subject to any disclaimer, the term of this patent is extended or adjusted under 35 U.S.C. 154(b) by 670 days.

(21) Appl. No.: 12/372,653

(22) Filed: Feb. 17, 2009

(65) Prior Publication Data

US 2010/0210220 A1 Aug. 19, 2010

(51) Int. Cl.
*H04B 1/06* (2006.01)

(52) U.S. Cl. .......................... 455/352; 455/41.3; 455/70

(58) Field of Classification Search .................. 455/352, 455/41.1, 41.2, 41.3, 68, 70
See application file for complete search history.

(56) References Cited

U.S. PATENT DOCUMENTS

| | | | | |
|---|---|---|---|---|
| 5,627,529 | A * | 5/1997 | Duckworth et al. | 340/12.24 |
| 6,091,330 | A | 7/2000 | Swan et al. | |
| 6,271,765 | B1 | 8/2001 | King et al. | |
| 7,183,933 | B2 | 2/2007 | Dzurko et al. | |
| 2003/0067380 | A1 | 4/2003 | Bedi et al. | |
| 2007/0057810 | A1* | 3/2007 | Bos et al. | 340/825.69 |
| 2009/0128363 | A1 | 5/2009 | Wagenhuber et al. | |
| 2009/0170434 | A1 | 7/2009 | Tengler et al. | |
| 2011/0019825 | A1* | 1/2011 | Shearer | 380/270 |

OTHER PUBLICATIONS

U.S. Appl. No. 12/348,154, filed Jan. 2, 2009, Chutorash et al.
U.S. Appl. No. 12/344,082, filed Dec. 24, 2008, Witkowski et al.
U.S. Appl. No. 12/328,663, filed Dec. 4, 2008, Chutorash et al.

* cited by examiner

*Primary Examiner* — James H Cho

(74) *Attorney, Agent, or Firm* — Foley & Lardner LLP

(57) ABSTRACT

A system for mounting to a first vehicle and for learning information from a first transmitter configured to be mounted to a second vehicle. The first transmitter is further configured to cause the activation of a remote device by transmitting a first control signal to the remote device. The system includes a receiver and processing electronics coupled to the receiver and configured to increase the sensitivity of the receiver. Increasing the sensitivity of the receiver is based on the receipt of a first command that indicates that the information will be communicated from the first transmitter. The receiver with increased sensitivity is configured to receive the information from the first transmitter. The processing electronics are configured to used the received information to determine signal characteristics. The system further includes a memory coupled to the processing electronics and configured to store the signal characteristics, and a second transmitter coupled to the processing electronics. The second transmitter is configured to receive a second command from the processing electronics to generate and transmit a second control signal based on the stored signal characteristics. The second control signal is transmitted to the remote device to cause the activation of the remote device.

29 Claims, 7 Drawing Sheets

VEHICLE TO VEHICLE WIRELESS CONTROL SYSTEM TRAINING

BACKGROUND

The present disclosure generally relates to systems and methods for configuring a wireless control system of a vehicle.

Vehicles are equipped from the manufacturer with built-in controls systems for activating remote devices, such as garage door openers. Some of the built-in control systems are trainable by the original handheld transmitter of a remote device. The original handheld transmitter is brought in very close proximity to the built-in control system and a sequence is initiated to train the built-in control system.

After the built-in control system is trained, the original handheld transmitter may be misplaced or discarded by the user. If the user buys a new car with an untrained built-in control system, the user will be unable to train the control system in the new car.

Thus, improved systems and methods for training a wireless control system mounted to a vehicle are needed.

SUMMARY

One embodiment of the invention relates to a system for mounting to a first vehicle and for learning information from a first transmitter configured to be mounted to a second vehicle. The first transmitter is further configured to cause the activation of a remote device by transmitting a first control signal to the remote device. The system comprises a receiver, and processing electronics coupled to the receiver and configured to increase the sensitivity of the receiver. Increasing the sensitivity of the receiver is based on the receipt of a first command that indicates that the information will be communicated from the first transmitter. The receiver with increased sensitivity is configured to receive the information from the first transmitter. The processing electronics are configured to used the received information to determine at least one signal characteristic. The system further comprises a memory coupled to the processing electronics and configured to store the at least one signal characteristic, and a second transmitter coupled to the processing electronics. The second transmitter is configured to receive a second command from the processing electronics to generate and transmit a second control signal based on the at least one stored characteristic. The second control signal is transmitted to the remote device to cause the activation of the remote device.

One embodiment of the invention relates to a system for mounting to a first vehicle and for communicating information to a first device configured to be mounted to a second vehicle. The system comprises a memory configured to store at least one signal characteristic and a transmitter configured to transmit a first control signal to cause the remote activation of a remote device. The first control signal is generated based on the at least one characteristic, the first control signal including the information. The system further comprises processing electronics coupled to the transmitter and the memory. The processing electronics is configured to provide a first command via wireless communication to the first device indicating that the information will be transmitted to the first device. The processing electronics provide a second command to the transmitter to generate and transmit the first control signal to the first device.

One embodiment of the invention relates to a method of learning information at a control system mounted to a first vehicle from a first transmitter configured to be mounted to a second vehicle. The first transmitter is configured to cause remote activation of a remote device by transmitting a first control signal to the remote device. The method comprises receiving a first command at the control system that indicates that the information will be communicated from the first transmitter, increasing the sensitivity of a receiver coupled to the control system based on the receipt of the first command and receiving the information from the first transmitter at the receiver. The method further comprises determining at least one signal characteristic based on the received information, storing the at least one signal characteristic in a memory device and receiving a second command at the control system to transmit a second control signal from a second transmitter coupled to the control system. The method further comprises generating the second control signal and transmitting the second control signal using the second transmitter to the remote device to cause the activation of the remote device.

Alternative exemplary embodiments relate to other features and combinations of features as may be generally recited in the claims.

DETAILED DESCRIPTION

Figure 1:
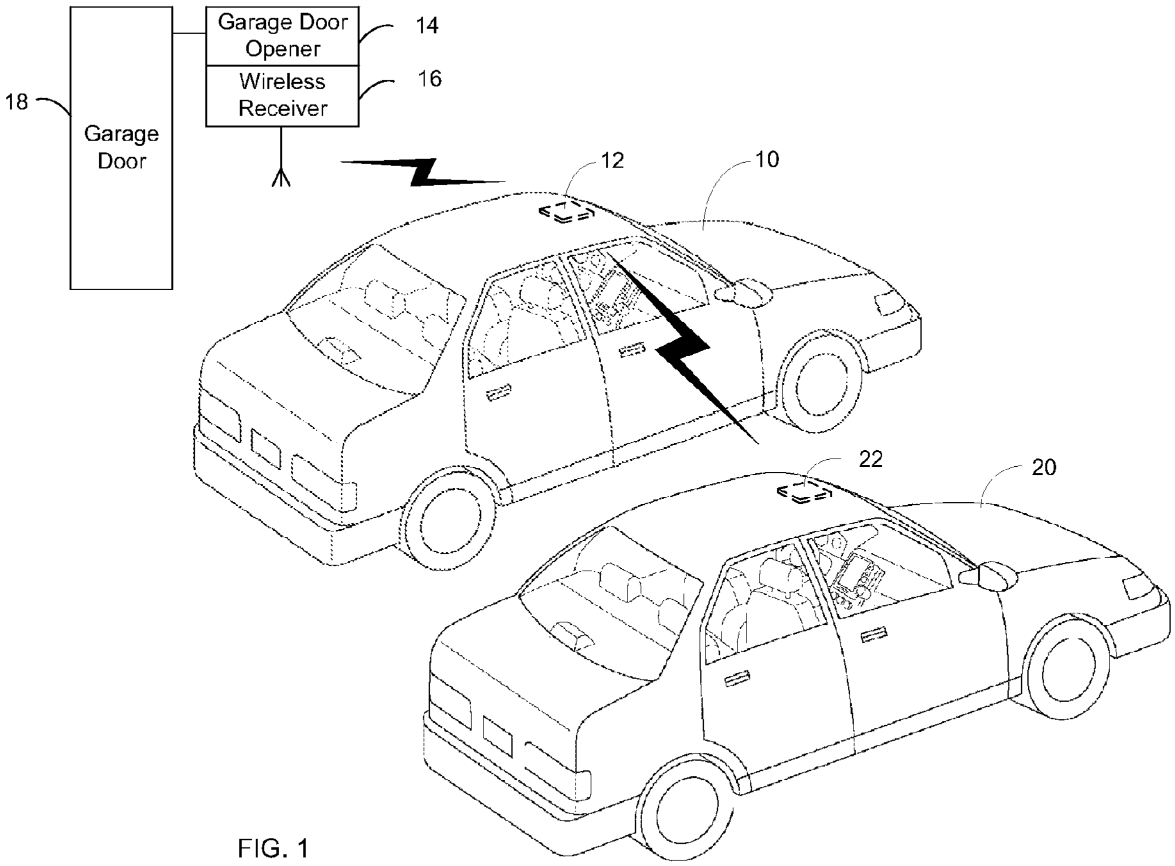
FIG. 1 is a perspective view that includes two vehicles and a garage door opener system where one of the vehicles trains a transmitter mounted to the other vehicle to activate the garage door opener according to one exemplary embodiment.

Referring to FIG. 1, vehicle 10 may be configured with transmitter 12 mounted in an overhead console, a visor, a front panel console, a door panel, center console, or in any other location in vehicle 10. Transmitter 12 is configured to cause the activation of a remote device by transmitting a control signal. The remote device may include garage door opener 14, home lighting system, home security system or any other home electronics system.

Garage door opener 14 includes wireless receiver 16 configured to receive the control signal from transmitter 12. In response to the received control signal, garage door opener 14 actuates garage door 18.

Vehicle 20 may be configured with control system 22 mounted in an overhead console, a visor, a front panel console, a door panel, center console, or in any other location in vehicle 20. Control system 22 is capable of learning control signals for activating remote devices, such as garage door opener 14. Control system 22 includes a receiver wherein the control system 22 configured to increase the sensitivity of the receiver in order to receive the control signal transmitted from transmitter 12 of the other vehicle 10. Control system 22 uses the information provided in the control signal to train a transmitter coupled to control system 22 of vehicle 20, which allows it to transmit a control signal configured to cause the activation of a remote device (e.g., garage door opener 14).

Figure 2:
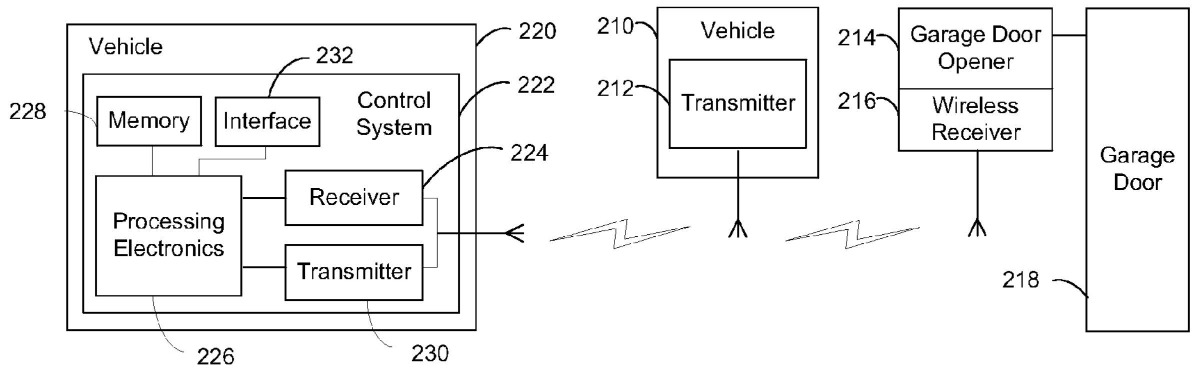
FIG. 2 is a schematic block diagram of an control system in a vehicle configured to be trained by a transmitter mounted to a second vehicle in accordance with an embodiment.

Referring to FIG. 2, transmitter 212 may be mounted to vehicle 210 and configured to transmit a control signal capable of causing the activation of garage door opener 214. Receiver 216 is coupled to garage door opener 214 and receives the control signal from transmitter 212. Garage door opener 214 actuates garage door 218 in response to the receipt of the control signal.

Control system 222 is mounted to vehicle 220 and includes receiver 224, processing electronics 226, memory 228, transmitter 230 and interface 232. Control system 222 may be placed in a training mode to train transmitter 230 to transmit a control signal to activate garage door opener 214 (in this embodiment and other embodiments, the control system alternatively may be configured to issue commands to the transmitter to directly cause it to transmit a control signal). Control system 222 may be configured to cause the receiver sensitivity to increase as a result of receiving a command to enter training mode, or an additional command to increase the sensitivity may be required. Processing electronics 226 is coupled to receiver 224 and configured to increase the sensitivity of receiver 224 based on the receipt of a command. The command may be received from a user via interface 232. The user may generate the command by pressing a button, pressing a sequence of buttons, selecting an option from a menu, entering a code, holding down a button, pressing multiple buttons at the same time, or using voice commands if the control system is equipped with speech recognition capabilities.

Once the command has been received via interface 232, processing electronics 226 increases the sensitivity of receiver 224. Receiver 224 may remain in a state of increased sensitivity for a predetermined period of time, or may return to normal sensitivity in response to an event (as described below). The circuitry of receiver 224 may include an analog to digital converter and the resolution of the analog to digital converter may be adjusted to increase the sensitivity of receiver 224. The sensitivity of receiver 224 may also be increased by adjusting the power supplied to the circuitry of receiver 224. Various other techniques may be employed to increase the sensitivity of the receiver in response to the command indicating that information will be communicated in a training mode.

After the sensitivity of receiver 224 is increased, transmitter 212 transmits a control signal containing information. The transmission may be initiated by a user input, such as pressing a transmit button. Receiver 224 receives the transmitted control signal. Alternatively, the user may be notified via the interface or some other display component of the vehicle that a signal is being transmitted and permission from the user to receive the incoming signal may be requested. After receiving the control signal the signal is processed. Alternatively, the user may be notified that a signal has been received and permission from the user to process the signal may be requested.

Processing electronics 226 receives the control signal via receiver 224 and uses the information contained in the control signal to determine at least one characteristic of the transmitted control signal. A signal characteristic might include a signal frequency, a signal modulation scheme, a particular code sequence, the number of bits in the code sequence, or the type of code transmitted (e.g., a variable or fixed code). The one or more signal characteristics are stored in a memory 228. Memory 228 may be any type of memory or combinations of types of memory, including volatile and non-volatile memory. The one or more signal characteristics may be used in different ways to determine the control signal required to activate the garage door opener 214. Control system 222 may be configured to include a plurality of prestored control signals for various garage door openers organized by characteristics that distinguish the control signal of one garage door opener from another. For example, processing electronics 226 may identify a frequency and/or code length of the transmitted control signal and use that information in conjunction with a look up table to determine a make and model of the garage door opener with its corresponding control signal for activation of the garage door opener. Various other technique may be used to determine the appropriate control signal to transmit in order to activate the garage door opener.

After the appropriate control signal is identified, the transmitter 230 is trained, or configured, to transmit the control signal. Alternatively, the user may be notified that a control signal has been identified and permission to train the transmitter to transmit the control signal may be requested. After transmitter 230 is trained, a command may be provided to processing electronics 226 to transmit the determined control signal. The command may be provided by the user or it may be provided in response to an event, such as determining the appropriate control signal to activate the garage door opener 214. In response to the command, processing electronics 226 provides a command to transmitter 230 to generate and transmit the control signal that was determined based on the signal characteristic. Transmitter 230 transmits the control signal to the garage door opener 214 to cause the activation of the garage door opener 214.

The sensitivity of the receiver 224 may be decreased to normal after a predetermined period of time, in response to a direct command from the user, or in response to an event. The event may include configuring the transmitter to transmit the control signal, receiving a request from the user to process the received control signal, determining the signal characteristics, etc.

Figure 3:
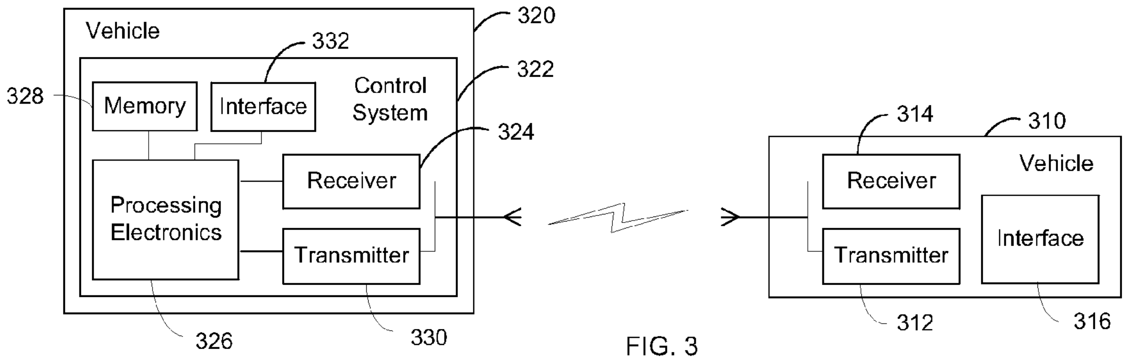
FIG. 3 is a schematic block diagram of an control system in a vehicle configured to be trained by a transmitter mounted to a second vehicle in accordance with an embodiment.

In another embodiment, the vehicles can have a high degree of interaction. Referring to FIG. 3, transmitter 312 and receiver 314 may be mounted to vehicle 310. Vehicle 310 may also be configured with an interface 316 for receiving user input commands. Transmitter 312 may be configured to transmit a control signal to activate a garage door opener or other types of remote devices, and may also be configured to communicate command or response signals to vehicle 320. Receiver 314 may be configured to receive signals from other transmitters, such as an original transmitter associated with a garage door opener for purposes of training transmitter 312 to transmit the appropriate control signal. Receiver 314 may also be configured to receive command or response signals from vehicle 320. Alternatively, vehicle 310 may be configured with transmitter 312 and no receiver 314.

Control system 322 is mounted to vehicle 320 and includes receiver 324, processing electronics 326, memory 328, transmitter 330 and interface 332. Control system 322 may be placed in a training mode to train transmitter 330 to transmit a control signal to activate a remote device, such as a garage door opener, using a command signal. Transmitter 312 may be configured to transmit the command signal to vehicle 320 as the result of a user input command provided at interface 316. After receiving the command signal, control system 322 may be configured to require a user input to enter training mode, such as a pressing of a button at interface 332 or a voice command. The user input provided to enter training mode may be provided internally to processing electronics 326 or it may also be transmitted to vehicle 310 to provide an acknowledgement that training mode is being entered. Control system 322 may be configured to cause the receiver sensitivity to increase as a result of entering training mode, or an additional command to increase the sensitivity may be required. The user may generate the command to increase the sensitivity of the receiver by pressing a button, pressing a sequence of buttons, selecting an option from a menu, entering a code, holding down a button, pressing multiple buttons at the same time, or using voice commands if the control system is equipped with speech recognition capabilities. Processing electronics 326 is coupled to receiver 324 and configured to increase the sensitivity of receiver 324 based on the receipt of the command.

The transmission of the command from vehicle 310 may be initiated by a user input command via interface 316 (e.g., voice or button), or it may be initiated by some other event, such as, the initiation of a control signal transmit. Transmitter 312 may be configured to transmit the control signal within a predetermined period of time after sending the command signal or it may wait for an acknowledgement from vehicle 320. If an acknowledgement is required for transmission, the acknowledgement may need to indicate that the command was received or that the command was received and vehicle 320 is in training mode. The acknowledgement from vehicle 320 may be initiated by a user input command at interface 332, or it may be initiated by an event, such as successful receipt of the command from transmitter 312.

After the sensitivity of receiver 324 is increased, transmitter 312 transmits a control signal containing information. The transmission may be initiated by a user input, such as pressing a transmit button or it may be initiated after a predetermined period of time. Receiver 324 receives the transmitted control signal. Alternatively, the user may be notified via interface 332 or some other display component of the vehicle that a signal is being transmitted and permission from the user to receive the incoming signal may be requested. After receiving the control signal, the control signal is processed. Alternatively, the user may be notified that a signal has been received and permission from the user to process the signal may requested.

Receiver 324, having increased sensitivity, receives the control signal and provides the signal to processing electronics 326 and uses the information contained in the control signal to determine at least one characteristic of the transmitted control signal. A signal characteristic might include a signal frequency, a signal modulation scheme, a particular code sequence, the number of bits in the code sequence, or the type of code transmitted (e.g., a variable or fixed code). The one or more signal characteristics are stored in a memory 328. Memory 328 may be any type of memory or combinations of types of memory, including volatile and non-volatile memory. The one or more signal characteristics may be used in different ways to determine the control signal required to activate the garage door opener 314. Control system 322 may be configured to include a plurality of prestored control signals for various garage door openers organized by characteristics that distinguish the control signal of one garage door opener from another. For example, processing electronics 326 may identify a frequency and/or code length of the transmitted control signal and use that information in conjunction with a look up table to determine a make and model of the garage door opener with its corresponding control signal for activation of the garage door opener. Various other technique may be used to determine the appropriate control signal to transmit in order to activate the garage door opener.

After the appropriate control signal is identified, transmitter 330 is trained, or configured, to transmit the control signal. Alternatively, the user may be notified that a control signal has been identified and permission to train transmitter 330 to transmit the control signal may be requested. After transmitter 330 is trained, a command may be provided to processing electronics 326 to transmit the determined control signal. The command may be provided by the user or it may be provided in response to an event, such as determining the appropriate control signal to activate the garage door opener. In response to the command, processing electronics 326 provides a command to transmitter 330 to generate and transmit the control signal that was determined based on the signal characteristic. Transmitter 330 transmits the control signal to the garage door opener to cause the actuation of the garage door.

The sensitivity of receiver 324 may be decreased to normal after a predetermined period of time, in response to a direct command from the user, or in response to an event. The event may include configuring transmitter 330 to transmit the control signal, receiving a request from the user to process the received control signal, determining the signal characteristics, etc.

Figure 4:
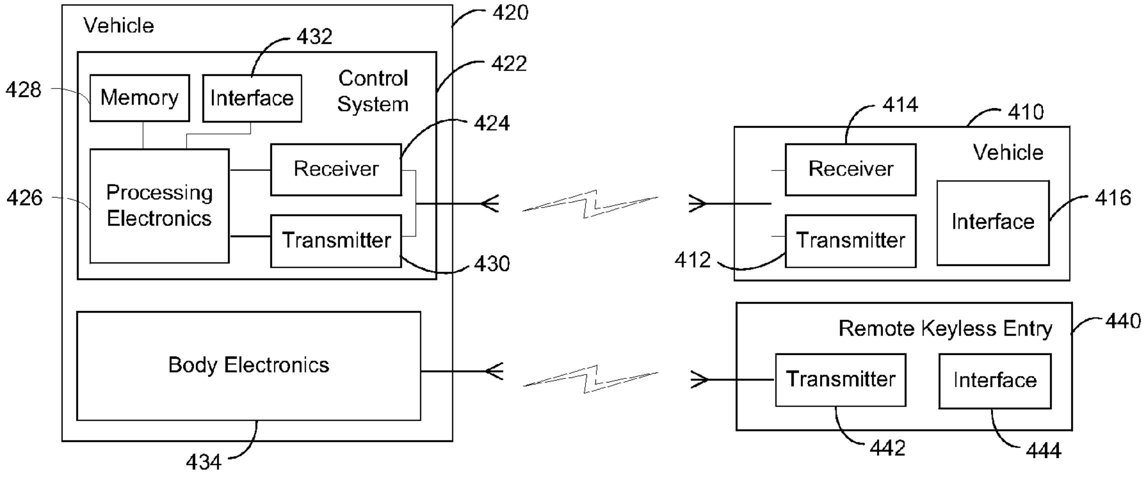
FIG. 4 is a schematic block diagram of an control system in a vehicle configured to be trained by a transmitter mounted to a second vehicle in accordance with an embodiment.

In another embodiment, the system may include a remote keyless entry. Referring to FIG. 4, transmitter 412 and receiver 414 may be mounted to vehicle 410. Vehicle 410 may also be configured with interface 416 for receiving user input commands. Transmitter 412 may be configured to transmit a control signal to activate a garage door opener or other types of remote devices. Receiver 414 may be configured to receive control signals from other transmitters, such as an original transmitter associated with a garage door opener for purposes of training transmitter 412 to transmit the appropriate control signal. Receiver 414 may also be configured to receive command or response signals from vehicle 420. Alternatively, vehicle 410 may be configured with transmitter 412 and no receiver 414.

Control system 422 is mounted to vehicle 420 and includes receiver 424, processing electronics 426, memory 428, transmitter 430 and interface 432. Vehicle 420 may also include body electronics 434 coupled to control system 422 and configured to receive command from remote keyless entry 440. Remote keyless entry 440 includes a transmitter 442 for transmitting the command to body electronics 434. Remote keyless entry 440 further includes interface 444 for receiving a user input to cause the transmission of the command to body electronics 434.

Control system 422 may be placed in a training mode to train transmitter 430 to transmit a control signal to activate a remote device, such as garage door opener, using a command signal. Remote keyless entry 440 may be configured to transmit the command signal to vehicle 420 as the result of a user input at interface 444. Interface 444 may include a specific button to provide the command, or the command may be initiated by pressing a sequence of buttons, holding down a button, or pressing multiple buttons at the same time. The command signal is transmitted to body electronics 434. Body electronics 434 recognizes the command signal and communicates the command to processing electronics 426. Alternatively, the user may use interface 432, or another interface associated with vehicle 420, to configure body electronic 434 to communicate received signals to processing electronics 426 for a predetermined period of time, until the user reconfigures body electronics 434, or until and event occurs, such as a decrease in the sensitivity of receiver 424. After receiving the command signal from remote keyless entry 440 via body electronics 434, control system 422 may be configured to enter training mode.

Alternatively, transmitter 412 may be configured to transmit the command signal to vehicle 420 as the result of a user input command provided at interface 416. After receiving the command signal, control system 422 may be configured to require a user input to enter training mode. The user input confirming that training mode may be entered may be provided to processing electronics 426 by remote keyless entry 440 via body electronics 434. The acknowledgement that training mode has been entered may be provided internally to processing electronics 426, or it may be transmitted to vehicle 410 to indicate that training mode is being entered.

Control system 422 may be configured to cause receiver sensitivity to increase as a result of entering training mode, or an additional command to increase the sensitivity may be required. The user may generate the command to increase the sensitivity of the receiver using interface 444 by pressing a button, pressing a sequence of buttons, holding down a button, or pressing multiple buttons at the same time. Processing electronics 426 is coupled to receiver 424 and configured to increase the sensitivity of receiver 424 based on the receipt of the command. Alternatively, the command to increase the sensitivity may be provided via interface 432 or interface 416 and communicated to processing electronics 426 via transmitter 412.

Transmitter 412 may be configured to transmit the control signal within a predetermined period of time after the command signal is sent or it may wait for an acknowledgement from vehicle 420. In order to initiate a transmission, the acknowledgement may need to indicate that the command was received or that the command was received and vehicle 420 is ready to receive the transmission. Alternatively, transmitter may simply wait for a user input at interface 416 to transmit the control signal.

After the sensitivity of receiver 424 is increased, transmitter 412 transmits a control signal containing information. The transmission may be initiated by a user input, such as pressing a transmit button or it may be initiated after a predetermined period of time. Receiver 424 receives the transmitted control signal. Alternatively, control system 422 may require user input for approval to receive the incoming control signal. The user may provide the approval via remote keyless entry 440. After receiving the control signal, the control signal is processed. Alternatively, control system 422 may require user input for approval to process the received control signal. The user may provide the approval via remote keyless entry 440.

Receiver 424, having increased sensitivity, receives the control signal and provides the signal to processing electronics 426, which uses the information in the control signal to determine at least one characteristic of the transmitted control signal. A signal characteristic might include a signal frequency, a signal modulation scheme, a particular code sequence, the number of bits in the code sequence, or the type of code transmitted (e.g., a variable or fixed code). The one or more signal characteristics are stored in memory 428. Memory 428 may be any type of memory or combinations of types of memory, including volatile and non-volatile memory. The one or more signal characteristics may be used in different ways to determine the control signal required to activate the garage door opener 414. Control system 422 may be configured to include a plurality of prestored control signals for various garage door openers organized by characteristics that distinguish the control signal of one garage door opener from another. For example, processing electronics 426 may identify a frequency and/or code length of the transmitted control signal and use that information in conjunction with a look up table to determine a make and model of the garage door opener with its corresponding control signal for activation of the garage door opener. Various other technique may be used to determine the appropriate control signal to transmit in order to activate the garage door opener.

After the appropriate control signal is identified, transmitter 430 is trained, or configured, to transmit the control signal. Alternatively, control system 422 may require approval to train the transmitter to transmit the control signal. The user may provide the approval via remote keyless entry 440. After transmitter 430 is trained, a command may be provided to processing electronics 426 to transmit the determined control signal. The command may be provided by the user or it may be provided in response to an event, such as a determination of the appropriate control signal to activate the garage door opener. In response to the command, processing electronics 426 provides a command to transmitter 430 to generate and transmit the control signal that was determined based on the at least one signal characteristic. Transmitter 430 transmits the control signal to the garage door opener to cause the activation of the garage door opener.

The sensitivity of receiver 424 may be returned to normal after a predetermined period of time, in response to a direct command from the user, or in response to an event. The event may include configuring transmitter 430 to transmit the control signal, receiving a request from the user to process the received control signal, determining the signal characteristics, etc.

Figure 5:
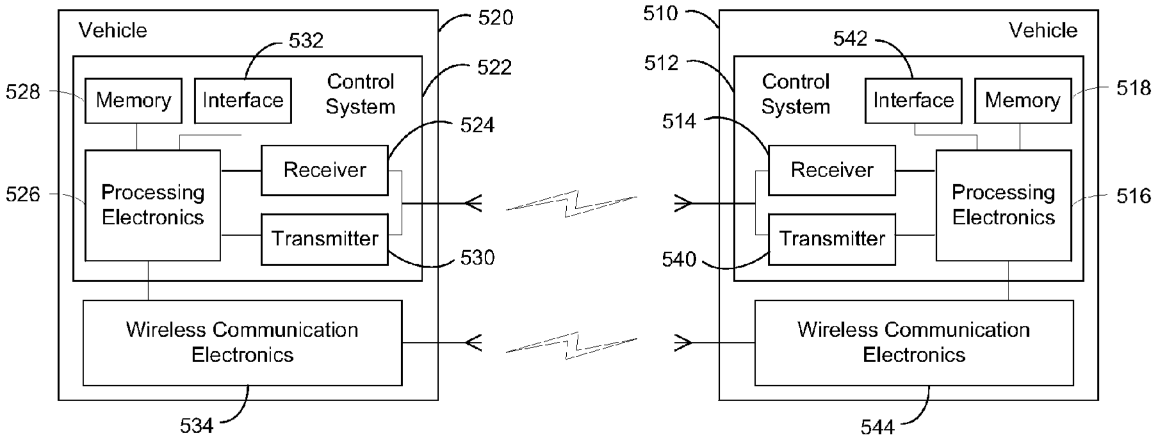
FIG. 5 is a schematic block diagram of an control system in a vehicle configured to be trained by a transmitter mounted to a second vehicle in accordance with an embodiment.

According to another embodiment, both vehicles may include advanced control systems of the type described herein. Referring to FIG. 5, control system 512 may be mounted to vehicle 510 and for communicating information to device configured to be mounted to vehicle 520. Control system 512 may include receiver 514, processing electronics 516, memory 518, transmitter 540 and interface 542. Vehicle 510 may also include wireless communication electronics 544 coupled to processing electronics 516 and configured to facilitate communication with remote devices and remote systems, such as control system 522 mounted in vehicle 520. Memory 518 may be any type of memory or combinations of types of memory, including volatile and non-volatile memory. Memory 518 may be configured to store at least one signal characteristic. A signal characteristic might include a signal frequency, a signal modulation scheme, a particular code sequence, the number of bits in the code sequence, or the type of code transmitted (e.g., a variable or fixed code). The one or more signal characteristics may be used in different ways to determine the control signal required to activate the garage door opener.

Once the appropriate control signal has been determined based on the at least one characteristic, processing electronics 516 may configure transmitter 540 to transmit the control signal each time a request to transmit is made. Alternatively, processing electronics may be configured to use the stored at least one characteristic to determine the control signal each time a request to transmit is made. Vehicle 510 may also be configured with an interface 542 for receiving user input commands. Transmitter 540 may be configured to transmit a control signal to activate a garage door opener or other types of remote devices. Receiver 514 may be configured to receive control signals from other transmitters, such as an original transmitter associated with a garage door opener for purposes of training transmitter 540 to transmit the appropriate control signal. Receiver 514 may also be configured to receive command or response signals from vehicle 520. Alternatively, vehicle 510 may be configured with transmitter 540 and no receiver 514.

Control system 522 is mounted to vehicle 520 and includes receiver 524, processing electronics 526, memory 528, transmitter 530 and interface 532. Vehicle 520 may also include wireless communication electronics 534 coupled to control system 522. Wireless communication electronics 534 are coupled to processing electronics 526 and configured to facilitate communication with remote devices and remote systems, such as control system 512 mounted in vehicle 510.

Wireless communication electronics 534 and 544 may include one or more of various types of communication electronics for communicating according to various wireless communication standards. For example, wireless communication electronics 544 may be configured to provide an IEEE 802.11 connection, and IEEE 802.15 connection, a Bluetooth® connection, a WiFi connection, a WiMax connection, cellular signal, a signal using Shared Wireless Access Protocol-Cord Access (SWAP-CA) protocol, or any other wireless connection. An IEEE 802.15 connection includes any wireless personal area networks (WPAN), such as ZigBee, Z-Wave, Bluetooth, UWB, and IrDA. Wireless communication electronics 544 may initiate a wireless communications connection with wireless communication electronics 534 using interface 542, or some other interface associated with wireless communication electronics 544. The connection may be established automatically or may require user approval via interface 532, or some other interface associated with wireless communication electronics 534. Alternatively, wireless communication electronics 534 may initiate a wireless communications connection with wireless communication electronics 544 using interface 532, or some other interface associated with wireless communication electronics 534.

After establishing a wireless communications connection initiated by wireless communication electronics 544, control system 522 may be placed in a training mode to train transmitter 530 to transmit a control signal to activate a remote device, such as garage door opener, using a command signal. Wireless communication electronics 544 may be configured to transmit the command signal to vehicle 520 as the result of a user input at interface 542 or some other interface mounted in vehicle 510 and associated with wireless communication electronics 544. The user input may be provided at interface 542, or any other interface associated with vehicle 510, by pressing a button, pressing a sequence of buttons, selecting an option from a menu, entering a code, holding down a button, pressing multiple buttons at the same time, or using voice commands if the control system is equipped with speech recognition capabilities. The command signal is transmitted to wireless communication electronics 534 and communicated to processing electronics 526. Control system 522 may enter training mode in response to the receipt of the command signal, or user approval may be required. User approval may be provided via interface 532, including using one or more buttons, selecting an option from a menu or providing a voice input command.

Control system 522 may be configured to cause receiver sensitivity to increase as a result of entering training mode, or an additional command to increase the sensitivity may be required. The user may generate the command to increase the sensitivity of the receiver using interface 542 by pressing a button, pressing a sequence of buttons, holding down a button, pressing multiple buttons at the same time, or a voice input command. Alternatively, an interface associated with wireless communication electronics 544 may be used to communicate the command to wireless communication electronics 534. Wireless communication electronics 534 communicates the command to processing electronics 526, and processing electronics 526 increases the sensitivity of receiver 524 based on the receipt of the command. Alternatively, the command to increase the sensitivity may be provided via interface 532, or an interface associated with wireless communication electronics 534, which is then communicated to processing electronics 526.

Transmitter 540 may be configured to transmit the control signal within a predetermined period of time after the command signal is sent or it may wait for an acknowledgement from vehicle 520. In order to initiate a transmission, the acknowledgement may need to indicate that the command was received or that the command was received and vehicle 520 is in training mode. Alternatively, transmitter may simply wait for a user input at interface 552 to transmit the control signal. Wireless communication electronics 534 and 544 may be configured to handle all of the coordination and acknowledgments required to prepare for transmission of the control signal.

After the sensitivity of receiver 524 is increased, transmitter 514 transmits a control signal containing information. The transmission may be initiated by a user input, such as pressing a transmit button or it may be initiated after a predetermined period of time. Alternatively, transmission may be initiated as a result of the communication between wireless communication electronics 534 and 544. Wireless communication electronics 534 may be configured to communicate the increase in receiver sensitivity to wireless communication electronics 544, which is then communicated to processing electronics 516. As a result of the received communication, processing electronics 516 may be configured to initiate the transmission of the control signal. Receiver 524 receives the transmitted control signal. Alternatively, control system 522 may require user input for approval to receive the incoming control signal. The user may provide the approval via interface 532, or wireless communication electronics 534 may provide the needed approval. After receiving the control signal, the control signal is processed. Alternatively, control system 422 may require user input for approval to process the received control signal. The user may provide the approval via interface 532, or wireless communication electronics 534 may provide the needed approval.

Receiver 524, having increased sensitivity, receives the control signal and provides the signal to processing electronics 526 and uses the information in the control signal to determine at least one characteristic of the transmitted control signal. A signal characteristic might include a signal frequency, a signal modulation scheme, a particular code sequence, the number of bits in the code sequence, or the type of code transmitted (e.g., a variable or fixed code). The one or more signal characteristics are stored in memory 528. Memory 528 may be any type of memory or combinations of types of memory, including volatile and non-volatile memory. The one or more signal characteristics may be used in different ways to determine the control signal required to activate the garage door opener. Control system 522 may be configured to include a plurality of prestored control signals for various garage door openers organized by characteristics that distinguish the control signal of one garage door opener from another. For example, processing electronics 526 may identify a frequency and/or code length of the transmitted control signal and use that information in conjunction with a look up table to determine a make and model of the garage door opener with its corresponding control signal for activation of the garage door opener. Various other technique may be used to determine the appropriate control signal to transmit in order to activate the garage door opener.

After the appropriate control signal is identified, transmitter 530 is trained, or configured, to transmit the control signal. Alternatively, control system 522 may require approval to train transmitter 530 to transmit the control signal. The user may provide the approval via interface 532 or wireless communication electronics 534 may provide the needed approval. After transmitter 530 is trained, a command may be provided to processing electronics 526 to transmit the determined control signal. The command may be provided by the user or it may be provided in response to an event, such as determining the appropriate control signal to activate the garage door opener. In response to the command, processing electronics 526 provides a command to transmitter 530 to generate and transmit the control signal that was determined based on the signal characteristic. Transmitter 530 transmits the control signal to the garage door opener to cause the actuation of the garage door.

The sensitivity of receiver 524 may be returned to normal after a predetermined period of time, in response to a direct command from the user, or in response to an event. The event may include configuring transmitter 530 to transmit the control signal, receiving a request from the user to process the received control signal, determining the signal characteristics, etc. Alternatively, the receiver sensitivity may be decreased as a result of a command signal received from wireless communication electronics 534. Wireless communication electronics 534 may be able assist processing electronics 526 in determining when to decrease the sensitivity of the receiver 524 by provided updates on the progress of the transmission of the control signal as received from wireless communication electronics 544. Wireless communication electronics 534 and 544 may be configured to monitor the control systems 522 and 512, respectively, while control system 522 is in training mode.

Figure 6:
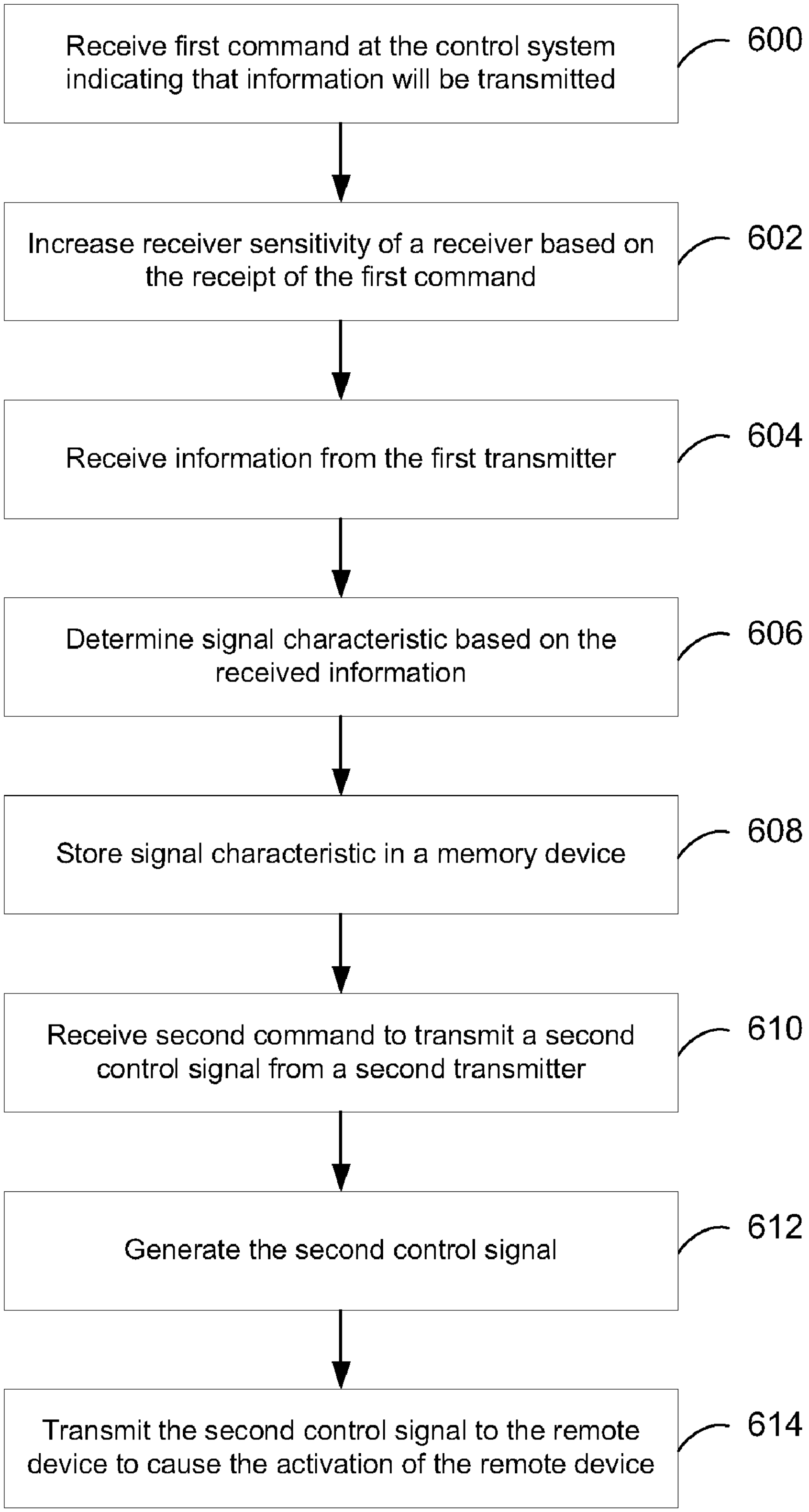
FIG. 6 is a flow diagram illustrating the steps taken to train a transmitter mounted in a vehicle using a transmitter mounted in a second vehicle in accordance with an embodiment.

Referring to FIGS. 2 and 6, in an exemplary embodiment, control system 222 is mounted to vehicle 220 and includes receiver 224, processing electronics 226, memory 228 and transmitter 230. Transmitter 212 is mounted to vehicle 210 and configured to cause remote activation of a remote device by transmitting a first control signal to the remote device. The remote device may include garage door opener 214.

In step 600 of FIG. 6, control system 222 receives a first command that indicates that the information will be communicated from transmitter 212. The command may be communicated to processing electronics 226 of control system 222 in a variety of ways. A user may provide the command to processing electronics 226 via interface 232 by pressing a button, pressing a sequence of buttons, selecting an option from a menu, entering a code, holding down a button, pressing multiple buttons at the same time, or using voice commands if the control system is equipped with speech recognition capabilities. As described above with respect to FIG. 4, the user may provide the command using remote keyless entry 440. Further, as described above with respect to FIG. 5, the command may be provided using wireless communication electronics 534 and 544. The command may be configured to place control system 222 in training mode to train transmitter 230 to transmit a control signal to activate garage door opener 214.

In step 602, the sensitivity of receiver 224 coupled to control system 222 is increased based on the receipt of the first command. The circuitry of receiver 224 may include an analog to digital converter and the resolution of the analog to digital converter may be adjusted to increase the sensitivity of receiver 224. The sensitivity of receiver 224 may also be increased by adjusting the power supplied to the circuitry of receiver 224. The sensitivity of receiver 224 may be decreased to normal after a predetermined period of time, in response to a direct command from the user, or in response to an event. The event may include configuring transmitter 230 to transmit the control signal, receiving a request from the user to process the received control signal, determining the signal characteristics, etc. In step 604, the information from transmitter 212 is received at receiver 224 with increased sensitivity.

In step 606, at least one signal characteristic is determined based on the received information. The signal characteristic might include a signal frequency, a signal modulation scheme, a particular code sequence, the number of bits in the code sequence, or the type of code transmitted (e.g., a variable or fixed code).

In step 608, at least one signal characteristic is stored in a memory 228. Memory 228 may be any type of memory or combinations of types of memory, including volatile and non-volatile memory. The one or more signal characteristics may be used in different ways to determine the control signal required to activate the garage door opener 214. Control system 222 may be configured to include a plurality of pre-stored control signals for various garage door openers organized by characteristics that distinguish the control signal of one garage door opener from another. For example, processing electronics 226 may identify a frequency and/or code length of the transmitted control signal and use that information in conjunction with a look up table to determine a make and model of the garage door opener with its corresponding control signal for activation of the garage door opener.

In step 610, control system 222 receives a second command to transmit a second control signal from transmitter 230 coupled to control system 222. After transmitter 230 is trained, a command may be provided to processing electronics 226 to transmit the determined control signal. The command may be provided by the user or it may be provided in response to an event, such as determining the appropriate control signal to activate the garage door opener 214.

In step 612, the second control signal is generated based on the determined signal characteristic. In step 614, the second control signal is transmitted using transmitter 230 to the remote device to cause the activation of the remote device.

Figure 7:
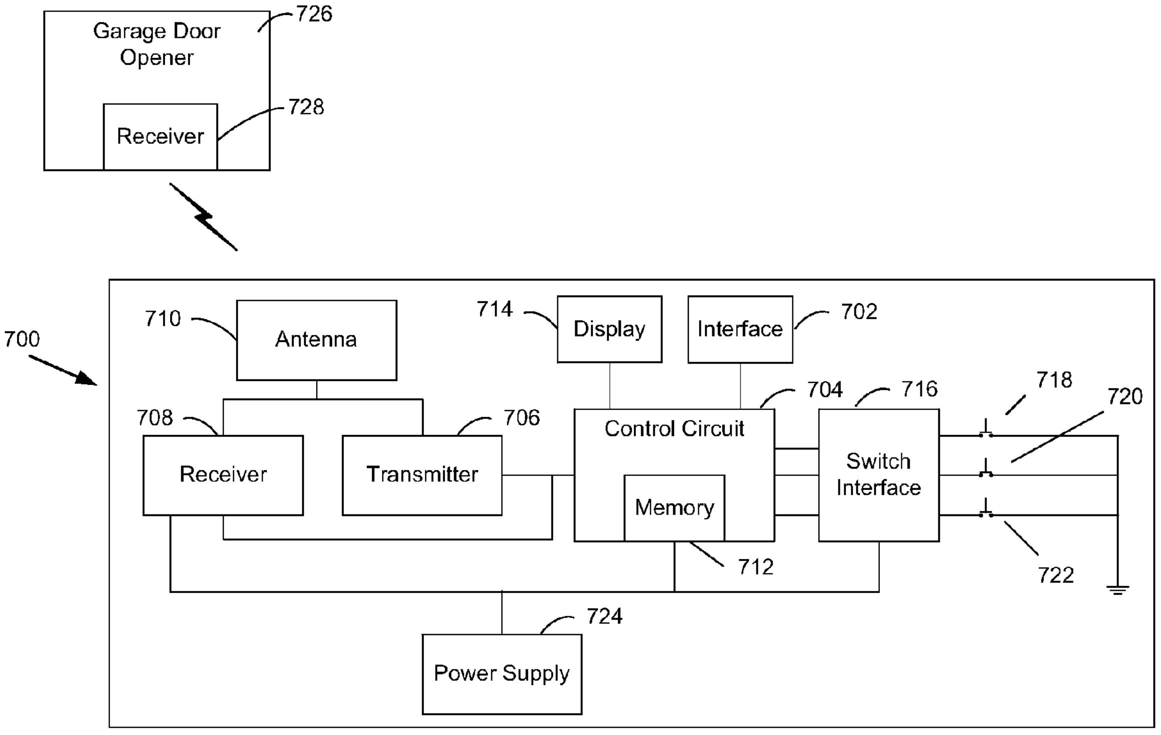
FIG. 7 is a schematic block diagram of a trainable transmitter used to cause the garage door opener to actuate the garage door in accordance with an embodiment.

Referring to FIGS. 2 and 7, control system 222 disposed in vehicle 220 may be a trainable transmitter 700. Trainable transmitter 700 includes a transmitter circuit 706 and a receiver 708 that are coupled to an antenna 710. In another embodiment, a single dual function transceiver having transmit and receive circuitry may be provided in place of a separate receiver and transmitter. Transmitter circuit 706 and receiver 708 are also coupled to a control circuit 704. Control circuit 704 may include various types of control circuitry, digital and/or analog, and may include a microprocessor, microcontroller, application specific integrated circuit (ASIC), or other digital and/or analog circuitry configured to perform various input/output, control, analysis, and other functions to be described herein. A switch interface 716 is coupled to a plurality of buttons or switches. Alternatively, other user input devices such as knobs, dials, etc., or a voice actuated input control circuit configured to receive voice signals from a vehicle occupant may be provided to receive user input. In an exemplary embodiment, switch interface 716 is coupled to one terminal of each of three push button switches 718, 720 and 722, which have their remaining terminal connected to ground. Switches 718, 720 and 722 may each be associated with a separate remote control system to be controlled, each of which may have its own unique operating RF frequency, modulation scheme, and/or control data. Thus, switches 718, 720 and 722 each correspond to a different radio frequency channel for transmitter circuit 706. It should be understood, however, that each channel may be trained to the same transmitter, if desired, or to different transmitters.

Trainable transmitter 700 may also be configured to include an interface 702 coupled to control circuit 704. Interface 702 may be coupled to vehicle body electronics or wireless communication electronics. Control circuit 704 may be configured to process the received data from the body electronics or wireless communication electronics and determine whether to enter training mode or provide approvals for certain requests as described above with respect to FIGS. 4 and 5.

Switch interface 716 couples signal information from switches 718, 720 and 722 to the input terminals of control circuit 704. Control circuit 704 includes data input terminals for receiving signals from the switch interface 716 indicative of the closure states of switches 718, 720 and 722. A power supply 728 is conventionally coupled to the various components for supplying the necessary operating power in a conventional manner.

Control circuit 704 is also coupled to a display 714 which includes a display element such as a light emitting diode (LED). Display 714 may alternatively include other display elements, such as a liquid crystal display (LCD), a vacuum fluorescent display (VFD), or other display elements. Control circuit 704 includes a memory 712 including volatile and/or non-volatile memory to, for example, store a computer program or other software to perform the functions described herein. Memory 712 is configured to store learned information such as control data and carrier frequency information that may be associated with switches 718, 720 and 722. In addition, for rolling code or other cryptographically encoded remote control systems, information regarding the rolling code or cryptographic algorithms for each system may be pre-stored and associated with frequencies and control data that may be used to identify a particular type of remote control system and, therefore, the appropriate cryptographic algorithm for the remote control system. As discussed previously, each switch or button 718, 720 and 722 may be associated with a separate remote control system, such as different garage door openers, electronically operated access gates, house lighting controls and other remote control systems, each which may have its own unique operating RF frequency, modulation scheme and control data.

Transmitter circuit 706 and receiver 708 communicate with the garage door opener 214 via antenna 710. Garage door opener 214 may be configured to receive control signals via receiver 216. Receiver 708 may be used to receive signals via antenna 710 and transmitter circuit 706 may be used to transmit signals via antenna 710. In an alternative embodiment, a separate antenna may be used with transmitter 706 and with receiver 708 (e.g., separate transmit and receive antennas may be provided in the trainable transmitter). Once a channel of trainable transmitter 700 has been trained, trainable transmitter 700 is configured to transmit a wireless control signal having control data that will control garage door opener 214. For example, in response to actuation of a switch, such as switch 718, transmitter circuit 706 is configured, under control from control circuit 704, to generate a control signal having a carrier frequency and control data associated with the particular trained channel. The control data may be modulated onto the control signal using, for example, frequency shift key (FSK) modulation, amplitude shift key (ASK) modulation or other modulation technique. The control data on the control signal may be a fixed code or a rolling code or other cryptographically encoded control code suitable for use with garage door opener 214. As mentioned previously, trainable transmitter 700 may learn the control code and carrier frequency for remote control system using an original transmitter for garage door opener 214.

Figure 8:
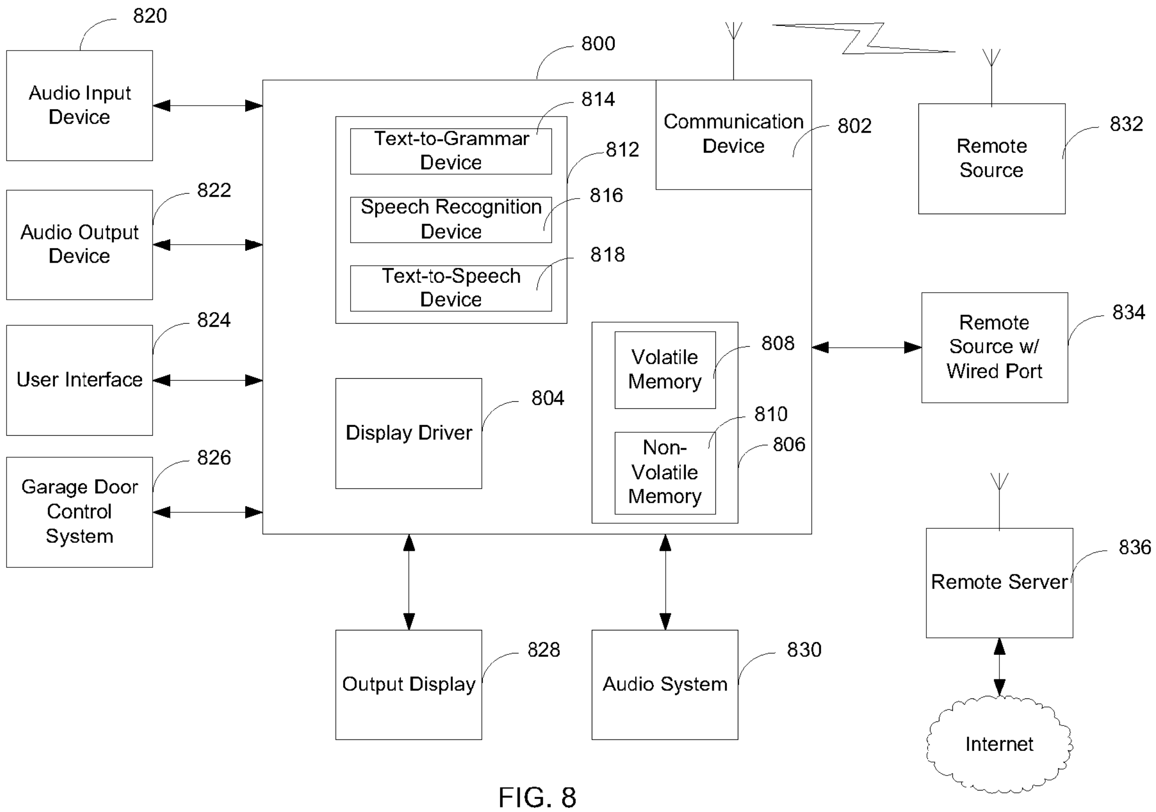
FIG. 8 is a schematic block diagram of a vehicle control system coupled to the garage door control system in the vehicle in accordance with an embodiment.

Referring to FIGS. 2 and 8, vehicle 220 may include an in-vehicle control system 800 capable of communicating with remote sources (e.g., remote source 832, 834 and 836) over a physical or wireless communication link. In-vehicle control system 800 may include a communication device 802, a display driver 804, a memory 806 and a data processing system 812. Memory device 806 includes both a volatile memory 808 and a non-volatile memory 810. Data processing system 812 may include a text-to-grammar device 814, a speech recognition device 816, and a text-to-speech device 818. Various systems and devices may be coupled to in-vehicle control system 800, including an audio input device 820, and audio output device 822, a user interface 824, a garage door control system 826, an output display 828 and an audio system 830.

Communication device 802 may be configured to establish a communication link with remote source 832. In one exemplary embodiment, in-vehicle control system 800 may establish a wireless communication link such as with Bluetooth® communications protocol, an IEEE 802.11 protocol, an IEEE 802.16 protocol, a cellular signal, a Shared Wireless Access Protocol-Cord Access (SWAP-CA) protocol, or any other suitable wireless technology. In another exemplary embodiment, in-vehicle control system 800 may establish a physical communication link such as with USB technology, Firewire technology, optical technology, other serial or parallel port technology, or any other suitable physical communication link. Communication device 802 may receive one or more data files from remote source 832. In various exemplary embodiments, the data files may include text, numeric data, or any combination thereof.

Data processing system 812 is coupled to communications device 802 and may be configured to control each function of in-vehicle control system 800. Data processing system 812 may facilitates speech recognition capabilities of in-vehicle control system 800 for the convenience of the user. Data processing system 812 may include digital or analog processing components or be of any past, present, or future design that facilitates control of in-vehicle control system 800. Data processing system 812 may be a single data processing device having various hardware and/or software components or multiple data processing devices. Data processing system 812 may be used to facilitate communication between remote sources and garage door control system 826.

Display driver 804 is coupled to an output display 828 and may be configured to provide an electronic signal to the output display. In one exemplary embodiment, the electronic signal may include the text and/or numeric data of the data files, while in other exemplary embodiments, any other desired data may be included with the text and/or numeric data or by itself in the electronic signal to the output display. In another exemplary embodiment, display driver 804 may be configured to control output display 828 with touch-screen capabilities, while in other exemplary embodiments, display driver 804 may be configured to control output display 828 without making use of touch-screen capabilities. In still other exemplary embodiments, display driver 804 may be of any past, present, or future design that allows for the control of output display 828.

User interface 824 may be configured to facilitate tactile user interaction with in-vehicle control system 800. In various exemplary embodiments, user interface 824 may include pushbuttons or rotatable knobs in any configuration or may include other tactile user contact points.

Audio system 830, for example an audio input receiver, may be configured to switch between various audio inputs, mix audio input signals into an audio output signal, provide volume control, filtering, attenuation, and/or other audio-related features. Audio system 830 may include various input devices such as compact disk players, radio components, satellite radio components, digital media players, etc. According to other various embodiments, audio system 830 may include switching, processing, or routing electronics. According to yet other various embodiments, audio system 830 may include any number of amplifiers, or provide audio output signals to amplifiers. Audio system 830 may include audio output devices or may provide signals to audio output devices. Audio system 1104 may be coupled to in-vehicle control system 800 via any physical or wireless communication connection as described above. According to an exemplary embodiment, audio system 1106 is any audio system of the past, present or future that accepts audio inputs and has an audio output capability.

Audio input device 820, for example a microphone, is configured to receive the utterance of a user for transmission to data processing system 812 for speech recognition so that the functions of in-vehicle control system 800 may be operated by voice command. According to an exemplary embodiment, audio input device 820 may be configured and used to receive user utterances for amplification to other users. Audio received by audio input device 820 may be sent to and from other systems and components of the vehicle such as in-vehicle control system 800, audio system 830, processor 812, memory device 810, audio output device 822, etc. The audio may be sent and received throughout the systems and components of vehicle 220 as audio data (e.g., audio signal(s), audio data, analog audio signal(s), digital audio signal(s), audio input signal(s), audio output signal(s), audio information, etc.). Regardless of whether the audio data or audio signal changes form, is processed, routed, amplified, attenuated, filtered or mixed, the terms “audio data” and “audio signal” may be used throughout this application to refer to any data or signal having an audio component. Audio output devices (e.g., audio output device 822, etc.) may be configured to provide the user with an audio prompt of various functions, such as user selection confirmation. According to an exemplary embodiment, audio output devices may exist within or externally from the housing of in-vehicle control system 800.

Data processing system 812 may include a text-to-grammar device 814, a speech recognition device 816, and a text-to-speech device 818. Text-to-grammar device 814 may be coupled to communications device 802 and may be configured to generate a phonemic representation of the text and/or numeric data of each of the data files received by communications device 802 from remote source 832. The phonemic representation of the text and/or numeric data of each data file may be configured to facilitate speech recognition of each data file. After conversion of a data file to a phonemic representation, the data file may be accessed via an oral input command received by speech recognition device 816 via audio input device 820.

Speech recognition device 816 may be configured to receive an oral input command from a user via audio input device 820. Speech recognition device compares the received oral input command to a set of predetermined input commands, which may have been configured by text-to-grammar device 814. In various exemplary embodiments, the input commands may be related to the playback of a media file, the dialing or input of a phone book entry, the entry or listing of calendar or contact data, the control of the HVAC system, or any other desired function to be performed on data. According to various exemplary embodiments, the input command may be related to initiating, terminating and/or otherwise controlling the training of trainable transmitter of garage door control system 826. Speech recognition device 816 may determine an appropriate response to the oral input command received from the user, for example, whether the oral input command is a valid or invalid instruction, what command to execute, or any other appropriate response.

Text-to-speech device 818 may be configured to convert the text and/or numeric data of each data file received from remote source 832 into an audible speech representation. This functionality may allow in-vehicle control system 800 to audibly give data to the user via audio output device 822 or the audio system. For example, in-vehicle control system 800 may repeat a user selected function back to the user, announce media file information, provide phonebook or contact information, or other information related to data stored in memory 806 or remote source 832.

Memory device 806 is configured to store data accessed by in-vehicle control system 800. For example, memory device 806 may store data input by remote source 832, data created by data processing system 812 that may be used later, intermediate data of use in a current calculation, or any other data of use by in-vehicle control system 800. Memory device 806 includes both a volatile memory 808 and a non-volatile memory 810. Volatile memory 808 may be configured so that the contents stored therein may be erased during each power cycle. Non-volatile memory 810 may be configured so that the contents stored therein may be retained across power cycles, such that upon system power-up, data from previous system use remains available for the user.

Garage door control system 826 may be coupled to in-vehicle control system 800 to utilize the speech recognition capabilities of in-vehicle control system 800. The user would be able to actuate the garage door opener 214 using voice commands or configure garage door control system 826 using voice inputs. Furthermore, garage door system 826 may coupled to in-vehicle control system 800 and configured to communicate with remote server 836 via communication device 802, wherein the remote server 836 provides access to the internet. If vehicle 210 and vehicle 220 are configured to access the Internet, then vehicle 220 may be configured to send and receive commands, requests and status information to and from vehicle 210 over the internet using server 836. In this way the training of vehicle 220 may be facilitated via an internet connection. Various techniques may be used to provide secure communication between vehicles, includes password protection, data encryption, etc.

Note that remote source 832 may be any suitable remote source that includes a transceiver and is able to interface with in-vehicle control system 800 over a communications link in either a wireless or physical embodiment. In various exemplary embodiments, remote source 832 may be one or more of a mobile phone, a personal digital assistant (PDA), a media player, a personal navigation device (PND), or various other remote data sources.

The exemplary embodiments illustrated in the Figures are offered by way of example only. Accordingly, the present disclosure is not limited to a particular embodiment, but extends to various modifications that nevertheless fall within the scope of the appended claims. The order or sequence of any processes or method steps may be varied or re-sequenced according to alternative embodiments.

Describing the disclosure with Figures should not be construed as imposing on the disclosure any limitations that may be present in the Figures. The present disclosure contemplates methods, systems and program products on any machine-readable media for accomplishing its operations. The embodiments of the present disclosure may be implemented using an existing computer processor(s), or by a special purpose computer processor for an appropriate vehicle system, incorporated for this or another purpose or by a hardwired system.

As noted above, embodiments within the scope of the present disclosure include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

It should be noted that although the diagrams herein may show a specific order of method steps, it is understood that the order of these steps may differ from what is depicted. Also, two or more steps may be performed concurrently or with partial concurrence. Such variation will depend on the software and hardware systems chosen and on designer choice. It is understood that all such variations are within the scope of the disclosure. Likewise, software implementations of the present disclosure could be accomplished with standard programming techniques with rule-based logic and other logic to accomplish the various connection steps, processing steps, comparison steps and decision steps.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated.

What is claimed is:

1. A system for mounting to a first vehicle and for learning information from a second transmitter configured to be mounted to a second vehicle and to cause the activation of a remote device by transmitting a first control signal to the remote device, the system comprising:

a receiver configured to receive the information from the second transmitter;

processing electronics coupled to the receiver and configured to use the received information to determine at least one signal characteristic, wherein processing electronics receives a first command that indicates that the information will be communicated from the second transmitter;

a memory coupled to the processing electronics and configured to store the at least one signal characteristic; and a first transmitter coupled to the processing electronics and configured to receive a second command from the processing electronics to transmit a second control signal based on the at least one stored characteristic, wherein the second control signal is transmitted to the remote device to cause the activation of the remote device;

wherein the processing electronics is configured to increase the sensitivity of the receiver based on the receipt of the first command, wherein the receiver with increased sensitivity is configured to receive the information from the second transmitter.

2. The system of claim 1, wherein the receiver includes an analog to digital converter, wherein the sensitivity of the receiving circuit is increased by adjusting the resolution of the analog to digital converter.

3. The system of claim 1, wherein sensitivity of the receiver is increased by adjusting the power supplied to the receiving circuit.

4. The system of claim 1, wherein the first command is a command to enter a training mode.

5. A system for mounting to a first vehicle and for learning information from a second transmitter configured to be mounted to a second vehicle and to cause the activation of a remote device by transmitting a first control signal to the remote device, the system comprising:

a receiver configured to receive the information from the second transmitter;

processing electronics coupled to the receiver and configured to use the received information to determine at least one signal characteristic, wherein processing electronics receives a first command that indicates that the information will be communicated from the second transmitter;

a memory coupled to the processing electronics and configured to store the at least one signal characteristic;

a first transmitter coupled to the processing electronics and configured to receive a second command from the processing electronics to transmit a second control signal based on the at least one stored characteristic, wherein the second control signal is transmitted to the remote device to cause the activation of the remote device; and body electronics coupled to the processing electronics and configured to receive a communication signal from a remote keyless entry device, wherein the body electronics provides the first command based on the receipt of the communication signal.

6. A system for mounting to a first vehicle and for learning information from a second transmitter configured to be mounted to a second vehicle and to cause the activation of a remote device by transmitting a first control signal to the remote device, the system comprising:

a receiver configured to receive the information from the second transmitter;

processing electronics coupled to the receiver and configured to use the received information to determine at least one signal characteristic, wherein processing electronics receives a first command that indicates that the information will be communicated from the second transmitter;

a memory coupled to the processing electronics and configured to store the at least one signal characteristic;

a first transmitter coupled to the processing electronics and configured to receive a second command from the processing electronics to transmit a second control signal based on the at least one stored characteristic, wherein the second control signal is transmitted to the remote device to cause the activation of the remote device; and first wireless communication electronics coupled to the processing electronics and configured to receive a communication signal from second wireless communication electronics coupled to the second vehicle, wherein the first wireless communication electronics provides the first command based on the receipt of the communication signal.

7. The system of claim 6, wherein the first wireless communication electronics is configured to establish a wireless personal area network.

8. A system for mounting to a first vehicle and for learning information from a second transmitter configured to be mounted to a second vehicle and to cause the activation of a remote device by transmitting a first control signal to the remote device, the system comprising:

a receiver configured to receive the information from the second transmitter;

processing electronics coupled to the receiver and configured to use the received information to determine at least one signal characteristic, wherein processing electronics receives a first command that indicates that the information will be communicated from the second transmitter;

a memory coupled to the processing electronics and configured to store the at least one signal characteristic; and a first transmitter coupled to the processing electronics and configured to receive a second command from the processing electronics to transmit a second control signal based on the at least one stored characteristic, wherein the second control signal is transmitted to the remote device to cause the activation of the remote device;

wherein the sensitivity of the receiver is configured to allow the receiver to receive information from the second transmitter when the second transmitter is mounted in the second vehicle and the receiver is mounted in the first vehicle and the first and second vehicles are in close proximity to one another.

9. A system for mounting to a first vehicle and for learning information from a second transmitter configured to be mounted to a second vehicle and to cause the activation of a remote device by transmitting a first control signal to the remote device, the system comprising:

a receiver configured to receive the information from the second transmitter;

processing electronics coupled to the receiver and configured to use the received information to determine at least one signal characteristic, wherein processing electronics receives a first command that indicates that the information will be communicated from the second transmitter;

a memory coupled to the processing electronics and configured to store the at least one signal characteristic;

a first transmitter coupled to the processing electronics and configured to receive a second command from the processing electronics to transmit a second control signal based on the at least one stored characteristic, wherein the second control signal is transmitted to the remote device to cause the activation of the remote device; and wherein the processing electronics are configured to provide a request to enter an information transfer mode to electronics mounted to the second vehicle, wherein the request causes the second transmitter coupled to the electronics to transmit information to the receiver.

10. The system of claim 9, wherein the request to enter the information transfer mode is provided as a coded signal.

11. The system of claim 9, wherein the request is provided based on the receipt of a user input command.

12. A system for mounting to a first vehicle and for learning information from a second transmitter configured to be mounted to a second vehicle and to cause the activation of a remote device by transmitting a first control signal to the remote device, the system comprising:

a receiver configured to receive the information from the second transmitter;

processing electronics coupled to the receiver and configured to use the received information to determine at least one signal characteristic, wherein processing electronics receives a first command that indicates that the information will be communicated from the second transmitter;

a memory coupled to the processing electronics and configured to store the at least one signal characteristic;

a first transmitter coupled to the processing electronics and configured to receive a second command from the processing electronics to transmit a second control signal based on the at least one stored characteristic, wherein the second control signal is transmitted to the remote device to cause the activation of the remote device; and an interface coupled to the processing electronics, wherein the first command is provided based on the receipt of a user input command via the interface.

13. A system for mounting to a first vehicle and for communicating information to a device configured to be mounted to a second vehicle, the system comprising:

a memory configured to store at least one signal characteristic;

a transmitter configured to transmit a first control signal to cause the remote activation of a remote device, wherein the first control signal is generated based on the at least one characteristic, the first control signal including the information; and processing electronics coupled to the transmitter and the memory, the processing electronics configured to provide a first command via wireless communication to the device indicating that the information will be transmitted to the device, and configured to provide a second command to the transmitter to generate and transmit the first control signal to the device.

14. The system of claim 13, further comprising:

first wireless communication electronics coupled to the processing electronics and configured to transmit a communication signal to second wireless communication electronics coupled to the second vehicle, wherein the communication signal provides the first command.

15. The system of claim 14, wherein the first wireless communication electronics is configured to establish a wireless personal area network.

16. The system of claim 14, wherein a Bluetooth connection is established between the first wireless communication electronics and the second wireless communication electronics.

17. The system of claim 13, wherein the device is configured to increase the sensitivity of a receiver coupled to the device in response to the first command.

18. The system of claim 13, wherein the first command is provided based on the receipt of a user input command.

19. The system of claim 13, wherein the second command is provided based on the receipt of a user input command.

20. The system of claim 13, wherein the processing electronics is configured to enter an information transfer mode based on the receipt of a request to enter an information transfer mode from the device.

21. The system of claim 13, wherein the request to enter the information transfer mode is provided as a coded signal.

22. A method of learning information at a control system mounted to a first vehicle from a first transmitter configured to be mounted to a second vehicle, the first transmitter configured to cause remote activation of a remote device by transmitting a first control signal to the remote device, the method comprising:

receiving the information from the first transmitter at a receiver coupled to the control system;

determining at least one signal characteristic based on the received information;

storing the at least one signal characteristic in a memory device;

receiving a command at the control system to transmit a second control signal from a second transmitter coupled to the control system;

generating the second control signal; and transmitting the second control signal using the second transmitter to the remote device to cause the activation of the remote device;

wherein the control system is a first control system and the second vehicle includes a second control system, the method further comprising:

communicating a request to enter a data transfer mode from the first control system to the second control system;

wherein the request is communicated based on a request command provided to the first control system;

wherein the request command is provide in response to a user input wherein the request command is provided to the second control system using at least one of a IEEE 802.11 connection, and IEEE 802.15 connection, a Bluetooth® connection, a WiFi connection and a WiMax connection.

23. The method of claim 22, further comprising:

identifying a make and model of the remote device based on the stored at least one characteristic.

24. The method of claim 23, further comprising:

determining the second control signal based on the identified make and model of the remote device.

25. The method of claim 24, wherein the make and model and corresponding second control signal of the remote device are prestored in the memory device.

26. The method of claim 22, wherein the request is a request to receive the information from the second control system.

27. The method of claim 22, further comprising:

receiving a signal at the control system that indicates that the information will be communicated from the first transmitter; and adjusting the sensitivity of the receiver based on the receipt of the signal.

28. The method of claim 27, wherein adjusting the sensitivity of the receiver comprises increasing the sensitivity of the receiver.

29. A method of learning information at a control system mounted to a first vehicle from a first transmitter configured to be mounted to a second vehicle, the first transmitter configured to cause remote activation of a remote device by transmitting a first control signal to the remote device, the method comprising:

receiving the information from the first transmitter at a receiver coupled to the control system;

determining at least one signal characteristic based on the received information;

storing the at least one signal characteristic in a memory device;

receiving a command at the control system to transmit a second control signal from a second transmitter coupled to the control system;

generating the second control signal;

transmitting the second control signal using the second transmitter to the remote device to cause the activation of the remote device;

receiving a signal at the control system that indicates that the information will be communicated from the first transmitter; and adjusting the sensitivity of the receiver based on the receipt of the signal, wherein the request to enter a data transfer mode is a coded signal.

* * * * *